Figure 1:
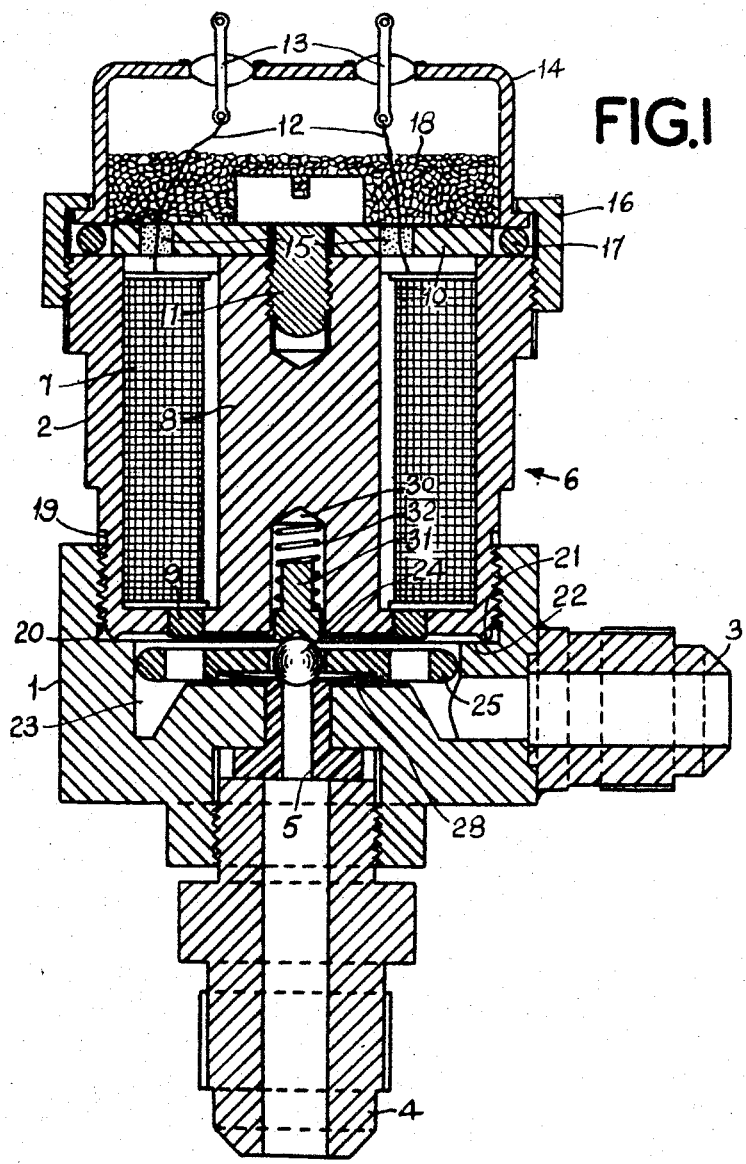

April 1, 1958 R. T. HALES 2,828,936

EXPANSION VALVES FOR REFRIGERATION PLANTS

Filed July 30, 1954

United States Patent Office 2,828,936
Patented Apr. 1, 1958

2,828,936

EXPANSION VALVES FOR REFRIGERATION PLANTS

Richard Thomas Hales, Bexley, England, assignor to J. & E. Hall Limited, Dartford, Kent, England, a British company Application July 30, 1954, Serial No. 446,804

Claims priority, application Great Britain January 21, 1954

7 Claims. (Cl. 251—86)

This invention relates to expansion valves such as are employed between the condenser and the evaporator in refrigeration plants, and has for its object to provide an expansion valve which acts more rapidly and with greater certainty than the valves hitherto used for the purpose.

In British patent specification No. 639,682 there is described an expansion valve for controlling the flow of refrigerant from the condenser to the evaporator in a refrigeration plant, in particular a refrigeration plant employing a high pessure refrigerant, which comprises a valve member, a seating for the valve member, a return spring normally holding the valve member on the seating, an armature of weight not exceeding twice the weight of the valve member loosely secured to the valve member and an electromagnet which when energised attracts said armature and thereby lifts the valve member off its seating. In a preferred form of the expansion valve according to specification No. 639,682 the valve member is in the form of a pointed rod loosely attached to the armature by means of a spring clip and the electromagnet is separated from the armature by a diaphragm.

In the type of magnetic expansion valve described in specification No. 639,682 the clearance between the armature and magnet is of necessity very small in order that the magnet shall be able to attract the armature against the high pressure prevailing in the valve. With a valve in the form of a pointed rod I have found that it is difficult to obtain a large enough area through the valve seat since the valve member never comes fully clear of the seat when the valve is open.

The object of the present invention is the provision of an improved magnetic expansion valve in which the valve member is extremely light, is completely free to find its own seating when closing, and which, when open, gives an adequate passage through the valve seating.

According to the invention an expansion valve for controlling the flow of refrigerant from the condenser to the evaporator in a refrigeration plant comprises a spherical valve member, a seating for the valve member, a return spring normally holding the valve member on its seating, an armature surrounding the spherical valve member, an electromagnet arranged adjacent to the armature on the side of the latter remote from the valve seating, and means on the armature adapted to remove the spherical valve member from its seating against the action of said return spring upon movement of the armature towards the electromagnet when the latter is energised.

By employing a spherical valve member it is possible to remove the valve member completely clear of the seating in the open position of the valve to provide an adequate passage through the valve seat and yet have a smaller air-gap between the armature and the electromagnet in the closed position of the valve than in the case of a valve employing a valve member in the form of a pointed rod. Consequently the valve is more certain in action than a valve employing a valve member in the form of a pointed rod.

Figure 2:
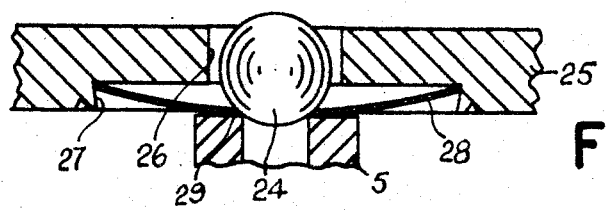

A preferred embodiment of an expansion valve according to the invention will now be described with reference to the accompanying drawing, in which Figure 1 is a sectional elevation of the expansion valve, and Figure 2 is a sectional elevation on an enlarged scale, of a detail of Figure 1.

Referring to the drawing, the expansion valve illustrated comprises a housing made in two parts 1, 2. The housing part 1 is provided with an inlet 3 and an outlet 4. The latter is screw-threaded into the part 1 and serves to retain a valve seating 5 in position in the housing part 1. The seating 5 is preferably made of fluon (polytetrafluoroethylene) or nylon (a synthetic linear polyamide), but it may also be made of stainless steel.

The housing part 2 serves as the yoke of the electromagnet of the expansion valve, the electromagnet being generally designated by the reference numeral 6. The electromagnet 6 comprises an energising coil 7 and a centre piece 8, the latter being brazed at 9 to the housing part 2 to provide a gas-tight connection between the two parts. At its end remote from its connection to the centre piece 8 the housing part 2 is closed by a cover 10 held in position by a screw 11 threaded into the centre piece 8. Electric leads 12 pass from the coil 7 through the cover 10 and through glass seals 13 mounted in a cover 14, the leads 12 being electrically insulated from the cover 10 by means of insulators 15. The cover 14 is secured to the housing part 2 by a nut 16 threaded on to the part 2, a sealing ring 17 being provided between the cover 14 and the housing part 2. A small quantity of a desiccant 18, such as activated alumina or silicon-gel, is placed inside the cover 14 to take up any free moisture either in the air trapped during assembly of the coil 7 in the housing part 2 or which may be driven off from the coil 7 in use.

The housing part 2 is provided with an external screw threaded portion 19, at its end remote from the cover 14, which screws into an internally threaded recess 20 in the housing part 1. A knife edge portion 21 on the housing part 2 bears against a shoulder 22 in the housing part 1 so that a gas-tight seal is provided between the two housing parts when they are assembled together.

When the two housing parts are assembled together a small chamber 23 is formed which is in communication with the inlet 3 and the outlet 4 through the valve seating 5. This chamber 23 houses the spherical valve member and armature of the expansion valve. The valve member consists of a small steel ball 24 and the armature is in the form of a flat circular plate 25 having a thickness slightly less than the diameter of the ball 24. The armature has a central circular aperture 26 of slightly greater diameter than the ball 24, the latter being received in this aperture. On its side facing the valve seating 5 the armature is provided with a circular recess 27 concentric with the aperture 26 and in this recess there is secured a thin circular bowed disc 28 made from hardened and tempered alloy steel. The disc 28 has a central circular aperture 29 the diameter of which is smaller than the diameter of the ball 24 (see Figure 2).

The centre piece 8 is provided with a recess 30 which houses a plunger 31 and a return spring 32. The plunger 31 is forced by the spring 32 against the ball 24 to press the latter on the valve seating 5. It will be noted, from Figure 2, that the disc 28 does not touch the ball 24 when the latter is pressed against the seating 5. As a result the ball 24 is free to find its own seating under the influence of the spring 32 without being restricted in any way by the armature or the disc 28.

When the coil 7 is energised, by connecting the leads 12 to a suitable electric supply source, the armature is attracted to the centre piece 8 and the disc 28 lifts the ball 24 from the seating 5 against the action of spring 32.

What I claim is:

1. A magnetic valve structure, comprising, in combination, housing means defining a valve chamber, fluid inlet and outlet means in communication therewith, and a valve seat intermediate said inlet and outlet means; a spherical valve member arranged in said valve chamber and movable relative to said valve seat between valve-open and valve-closed positions; spring means for biasing said valve member to its valve-closed position; and magnetic means for moving said valve member from its valve-closed position to its valve-open position against the action of said spring means, said magnetic means including armature means adapted to engage said valve member for moving the same from its valve-closed position to its valve-open position when said armature means moves relative to said valve seat in a direction corresponding to the direction of movement of said valve member while the latter moves from its valve-closed position to its valve-open position, said armature means including a plate member formed with a bore therethrough having a diameter slightly greater than the diameter of said valve member and a valve member engaging portion adapted to engage said valve member, said armature means being movable relative to said housing means between an inoperative position wherein said engaging portion is arranged between said valve seat and the greatest circumference of said valve member in a plane substantially parallel to said valve seat when said valve member is in its valve-closed position but out of engagement with said valve member and wherein said bore of said plate member encompasses said valve member, an intermediate position wherein said engaging portion is arranged between said valve seat and the greatest circumference of said valve member in said plane when said valve member is in its valve-closed position and is in engagement with said valve member and wherein said bore of said plate member encompasses said valve member, and an operative position wherein said engaging portion is in engagement with said valve member and has moved the same to its valve-open position and wherein said bore of said plate member encompasses said valve member, said magnetic means further including magnetic flux generating means in the region of said armature means for generating, while energized, a field of magnetic flux which will move said armature means in said direction from its inoperative position to its intermediate position and from there to its operative position whereby said valve member in its valve-closed position is out of engagement with said armature means and may therefore be freely urged into and maintained in said valve-closed position by said spring means but may be moved from its valve-closed position to its valve-open position when said magnetic flux generating means is energized.

2. A magnetic valve structure, comprising, in combination, housing means defining a valve chamber, fluid inlet and outlet means in communication therewith, and a valve seat intermediate said inlet and outlet means; a spherical valve member arranged in said valve chamber and movable relative to said valve seat between valve-open and valve-closed positions; spring means for biasing said valve member to its valve-closed position; and magnetic means for moving said valve member from its valve-closed position to its valve-open position against the action of said spring means, said magnetic means including armature means adapted to engage said valve member for moving the same from its valve-closed position to its valve-open position when said armature means moves relative to said valve seat in a direction corresponding to the direction of movement of said valve member while the latter moves from its valve-closed position to its valve-open position, said armature means including a plate member formed with a bore therethrough having a diameter slightly greater than the diameter of said valve member and a valve member engaging portion having an opening smaller than the diameter of said valve member and concentric with said bore of said plate member so as to be adapted to engage said valve member, said armature means being movable relative to said housing means between an inoperative position wherein said engaging portion is arranged between said valve seat and the greatest circumference of said valve member in a plane substantially parallel to said valve seat when said valve member is in its valve-closed position but out of engagement with said valve member and wherein said bore of said plate member encompasses said valve member, an intermediate position wherein said engaging portion is arranged between said valve seat and the greatest circumference of said valve member in said plane when said valve member is in its valve-closed position and is in engagement with said valve member and wherein said bore of said plate member encompasses said valve member, and an operative position wherein said engaging portion is in engagement with said valve member and has moved the same to its valve-open position and wherein said bore of said plate member encompasses said valve member, said magnetic means further including magnetic flux generating means in the region of said armature means for generating, while energized, a field of magnetic flux which will move said armature means in said direction from its inoperative position to its intermediate position and from there to its operative position whereby said valve member in its valve-closed position is out of engagement with said armature means and may therefore be freely urged into and maintained in said valve-closed position by said spring means but may be moved from its valve-closed position to its valve-open position when said magnetic flux generating means is energized.

3. A magnetic valve structure as defined in claim 2 wherein said valve seat is an annular one, wherein said opening of said engaging portion has a diameter greater than the diameter of said valve seat, and wherein said engaging portion is in engagement with said valve seat when said armature means is in its inoperative position.

4. A magnetic valve structure as defined in claim 3, wherein said plate member has a thickness slightly less than the diameter of said valve member.

5. A magnetic valve structure as defined in claim 3, wherein said plate member is formed in that face thereof which is nearer to said valve seat with a recess and wherein said engaging portion is constituted by an engaging member arranged in said recess.

6. A magnetic valve structure as defined in claim 5, wherein said recess is a circular one and wherein said engaging member is a disc member arranged therein.

7. A magnetic valve structure as defined in claim 6, wherein said disc member normally has an outer diameter slightly greater than the inner diameter of said recess so that said disc member is permanently bowed when positioned in said recess.

References Cited in the file of this patent

UNITED STATES PATENTS

| 230,173 | Brandeis | July 20, 1880 |
| 1,409,127 | Wasem | Mar. 7, 1922 |
| 1,507,582 | Christman | Sept. 9, 1924 |
| 1,709,095 | Protzeller | Apr. 16, 1929 |
| 1,822,668 | Protzeller | Sept. 8, 1931 |
| 2,631,612 | Buescher | Mar. 17, 1953 |

FOREIGN PATENTS

| 16,513 | Great Britain | July 18, 1907 |